May 18, 1937.  N. V. SMITH ET AL  2,080,513
POWER GREASE GUN
Filed Aug. 23, 1935  2 Sheets-Sheet 2
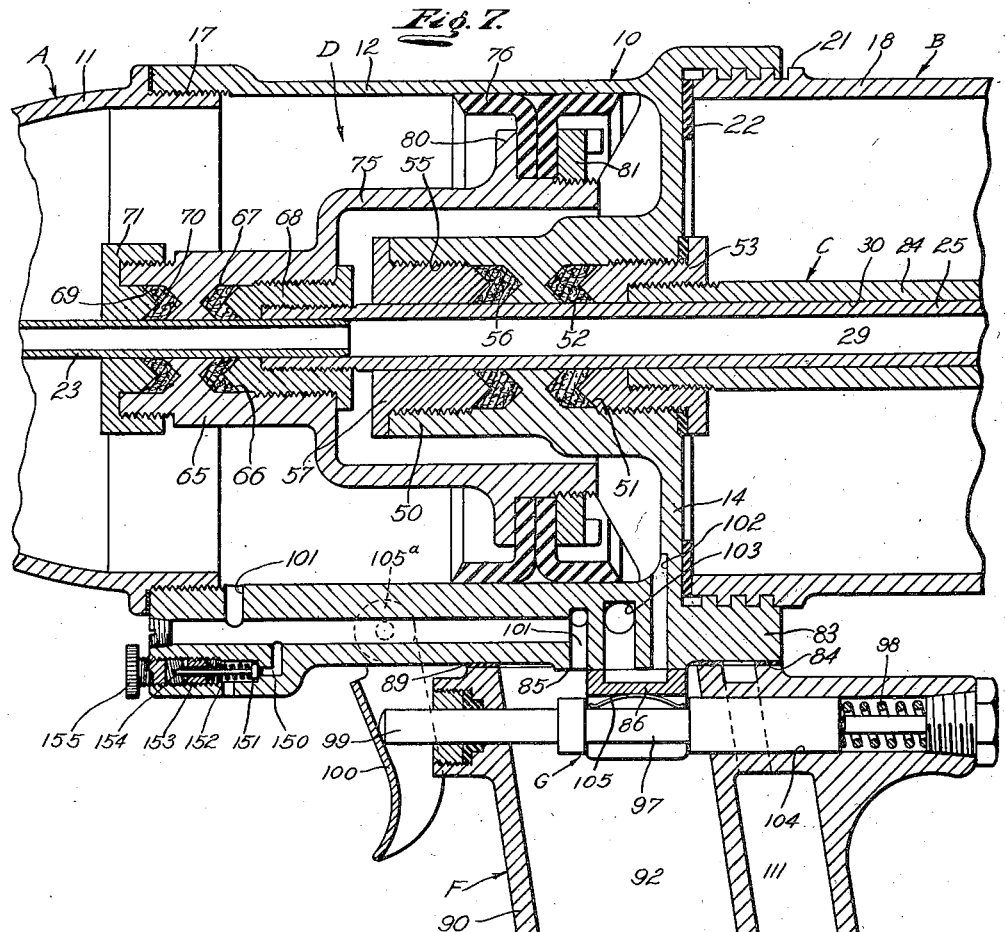
Fig. 7.
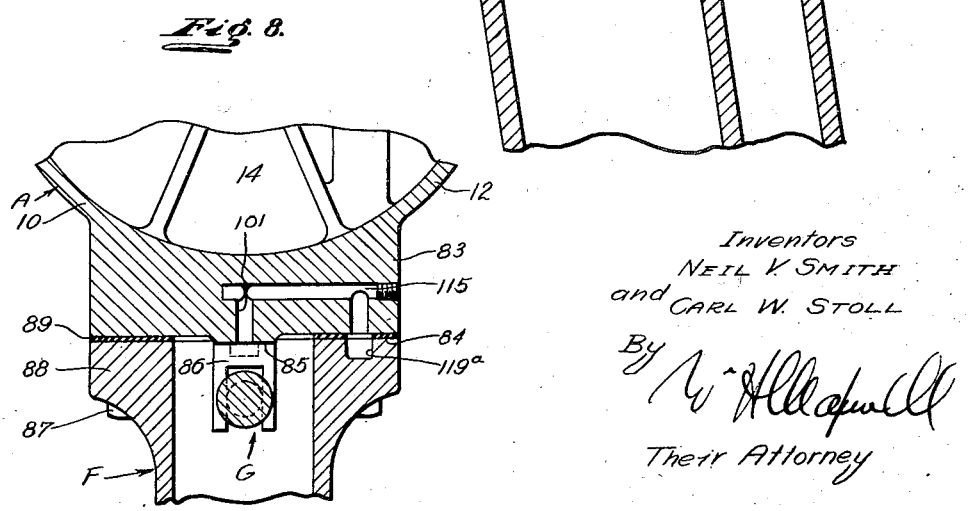
Fig. 8.
Inventors
NEIL V. SMITH
and CARL W. STOLL
By
Their Attorney Patented May 18, 1937

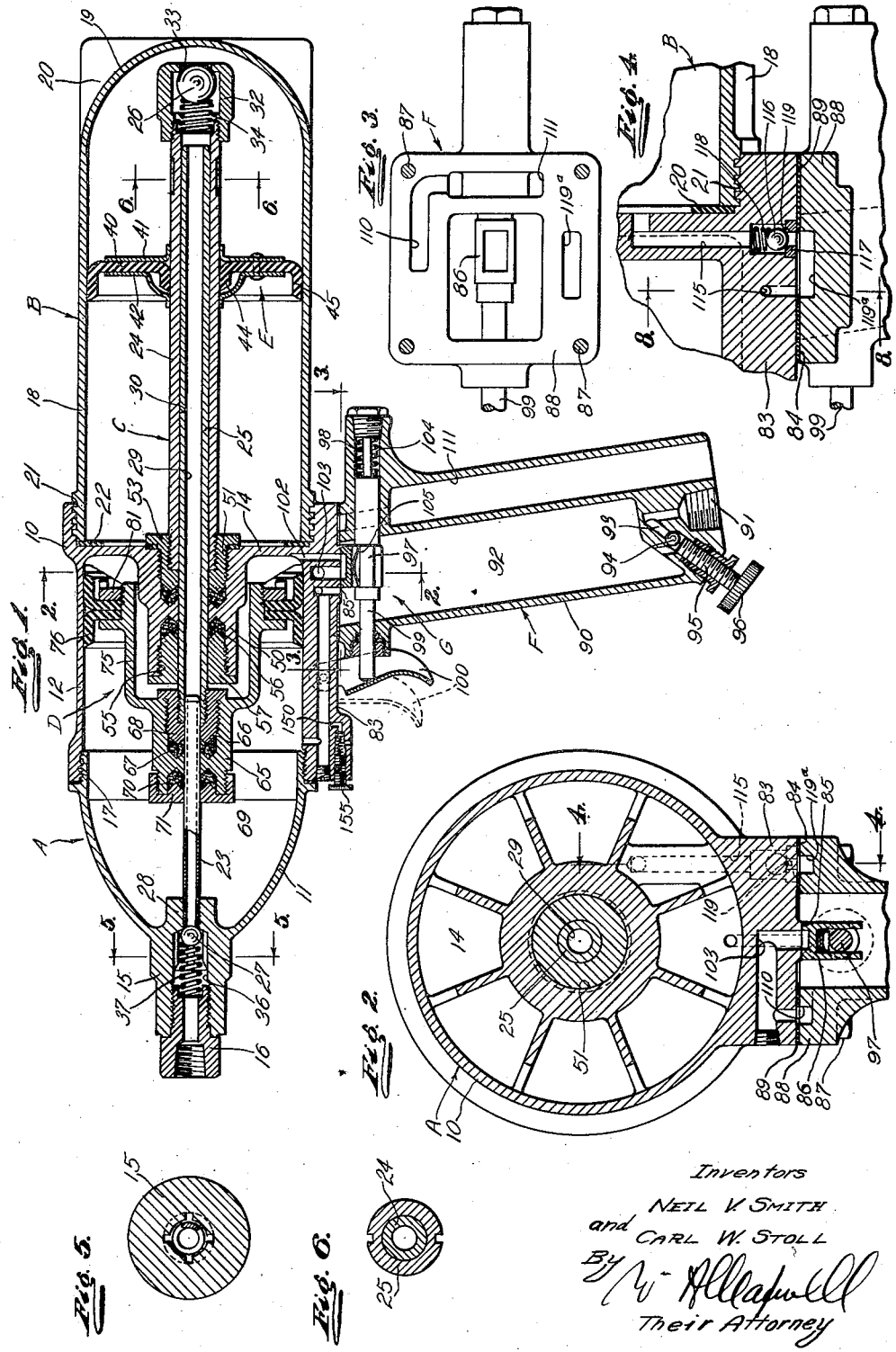

2,080,513

UNITED STATES PATENT OFFICE 2,080,513

POWER GREASE GUN

Neil V. Smith and Carl W. Stoll, Los Angeles, Calif., assignors to Smith-Johnson Corporation, Los Angeles, Calif., a corporation of California Application August 23, 1935, Serial No. 37,566

24 Claims. (Cl. 221—47.3)

This invention has to do with a power grease gun and relates more particularly to that type of grease gun or lubricant handling device in which the lubricant is delivered by the device at a high pressure developed from compressed air or other fluid under pressure supplied to the device under control of the operator.

It is a general object of this invention to provide a lubricant handling device of the character referred to which meets the various requirements or limitations of commercial users and which is particularly effective and efficient in handling heavy or viscous lubricants. Devices of the character referred to are used generally in the lubrication of motor vehicles, and the like, and to be practical and suitable for general use they must be relatively simple in form and operation, convenient to handle both during operation and during recharging, and effective and dependable in operation. In practice, these devices are used on various grades or types of lubricants and with most devices of this type it is found impossible or impractical to handle heavy or viscous lubricants such as do not flow readily under normal or usual feeding pressures. The inability of the usual grease gun to handle heavy lubricants is usually due to the fact that the usual gun construction is such that the gun has high internal resistance to the flow of lubricant. The device provided by this invention is so formed, and its parts are so related that the lubricant is handled with a minimum of resistance and therefore extremely heavy or viscous lubricants are handled efficiently and dependably.

Another object of this invention is to provide a device of the character mentioned which is simple and inexpensive of manufacture. The device of the present invention is such that the assembly or complete device is compact and neat in appearance, and the various parts or elements entering into the device are simple in form and are such that they can be readily assembled. The principal parts entering into the device are such that they can be die cast or formed from stock material, making the device inexpensive of manufacture.

Another object of the invention is to provide an effective convenient grouping of elements in the device whereby the device can be readily assembled and can be readily adjusted or repaired. A feature of the invention is the handle unit which is detachable from the other parts and which carries the control valve. The face of the valve is formed on the main body of the device and is at the face provided for receiving the handle.

Another object of this invention is to provide a high pressure ejecting means in a device of the character mentioned wherein there is an inlet valve which is large and such as to directly receive lubricant from the container. By the present invention, the inlet valve of the ejecting mechanism is arranged so that it is unrestricted as to size or design and is so located within the container that there is no intervening charging tube or passage to offer resistance to the flow of lubricant and thus increase the internal resistance of the device.

Another object of this invention is to provide a simple, compact construction in which the relatively moving parts that require packing are effectively packed against passage or escape of lubricant from the device and also against the entrance of air into the device. Through the design provided by the invention there are two points at which packing is required and at these points there are packing glands which are oppositely disposed to effectively pack in both directions.

Another object of this invention is to provide a novel, simple and effective arrangement and formation of parts by which the device is made compact and symmetrical and therefore pleasing in appearance. A particular feature of the construction is the formation of the piston of the operating means to accommodate the gland construction and at the same time keep the device compact and simple in formation.

It is another object of the present invention to provide for the application of fluid pressure to the container so that lubricant is positively fed by said pressure from the container past the inlet valve of the ejecting mechanism, the pressure being thereafter automatically exhausted or allowed to escape so that the container is normally free of pressure. By providing for the application of pressure to the container to feed lubricant therefrom past the inlet valve without maintaining pressure in the container allows the operator to remove the container shortly after the device has been operated without the danger or inconvenience that would accompany disengagement of the container while under pressure.

Another object of the invention is to provide an improved compact and highly efficient high pressure ejecting device for delivering the lubricant at a high pressure. The invention provides a hollow plunger operating in a barrel and over a hollow core, the inlet valve being carried by the barrel and being a large freely operating valve insuring full charging of the barrel.

Another object of the invention is to provide means for controlling the pressure delivered by the device. At some times it is desirable to deliver only a moderate pressure, whereas in other times high pressures are desired. The invention provides a control whereby either a normal working pressure or a high pressure can be obtained as the operator desires.

The various objects and features of this invention will be best and more fully understood from the following detailed description of a typical form and application of the invention, throughout which description reference may be had to the accompanying drawings, in which:

Fig. 1 is a central vertical longitudinal sectional view of the device provided by the invention; Fig. 2 is an enlarged detailed transverse sectional view taken as indicated by line 2—2 on Fig. 1; Fig. 3 is an enlarged detailed sectional view taken as indicated by line 3—3 on Fig. 1; Fig. 4 is a vertical detailed sectional view of a part of the mechanism taken as indicated by line 4—4 on Fig. 2; Fig. 5 is an enlarged detailed transverse sectional view taken as indicated by line 5—5 on Fig. 1; Fig. 6 is an enlarged detailed sectional view taken as indicated by line 6—6 on Fig. 1; Fig. 7 is an enlarged fragmentary detailed sectional view of a part of the mechanism and Fig. 8 is an enlarged fragmentary transverse detailed sectional view taken as indicated by line 8—8 on Fig. 4.

The device provided by this invention includes, generally, a main portion or body A, a reservoir or container B provided to carry a supply of lubricant, a high pressure ejector C, operable to receive lubricant from the container and deliver it at high pressure to the outlet of the body, operating means D for the ejector, a follower E operable in the container to act on lubricant therein, a handle F by which the device can be manipulated, control means G, and various other parts and elements which will be hereinafter referred to.

The body A forms the main or principal part of the device to which the other parts are connected or by which the other parts are carried. In the particular form of the invention illustrated, the body A is sectional and includes a main section 10 and an end or cap section 11. The main section 10 has a cylinder part 12, the axis of which is concentric with the major axis of the device. The cylinder part 12 is of substantial diameter and forms the cylinder of the operating means D hereinafter described. The body section 10 includes a pad or boss 83 on, what may be considered, the lower side of the cylinder part 12. This boss is for the reception of the handle F and to form the face for the valve of the control means G. A transverse division or wall 14 is provided in the body section 10 preferably adjacent its rear end.

The cap section 11 of the body A extends forward from the cylinder part 12 of section 10 and is shaped to terminate in an outlet 15 for the device. The outlet 15 carries certain parts of the ejector and is provided with a suitable coupling or fitting 16, as will be hereinafter more fully described.

The sections 10 and 11 of the body A are made detachable so that the interior of the body is accessible. In the particular case illustrated the sections are connected by a suitable threaded connection 17.

The container B forms a lubricant supply means and is in the nature of a holder or reservoir for the lubricant to be handled by the device. In accordance with the preferred form of the invention the container is carried by the body A so that it projects rearwardly therefrom. The container B includes a cylindrical body 18 and has one end open and adapted to connect with the rear end of the body section 10 and has its other end closed by an end 19. The end 19 is preferably formed integral with the body 18 and is cup-shaped or rounded as shown in Fig. 1 of the drawings so that lubricant fed rearwardly in the container is effectively fed to the inlet valve of the ejector, which valve is located centrally and immediately adjacent the end 19. Suitable flanges 20 may be provided on the exterior of the container at the rounded end 19 so that the container can be stood on end. The container B is detachably connected with the section 10 of the body A to facilitate removing the container for purpose of filling it. In the preferred construction, the container is threaded to the body section 10 by a coarse threaded connection 21 and a suitable washer 22 is provided between the end of the container and the body section 10 to make a tight joint between these parts.

The ejector C is embodied in the device so that it is operable to receive lubricant from the extreme rear end of the container B and deliver it to the outlet 15 at the extreme forward end of the device under high pressure. The ejector includes generally, three elements, two of which are relatively stationary and operate relative to the third element. In the embodiment illustrated there is a core 23 stationary relative to a barrel 24 while the third element is a displacement element or plunger 25 movable relative to the core and barrel. The ejector also includes suitable valves, namely an inlet valve 26 and an outlet valve 27. The core 23 and the barrel 24 are coaxial and are spaced longitudinally of each other within the structure. In the form of the invention illustrated the core and barrel are stationary in the structure and the plunger 25 is adapted to reciprocate relative to them.

The core 23 has an opening or port extending longitudinally through it and is carried by a suitable boss 28 at the outlet 15 so that it projects rearwardly therefrom and into the forward end portion of the plunger 25. The barrel 24 is carried by the wall 14 of the body section 10 so that it projects rearwardly therefrom through the container B. The barrel 24 terminates close to the rear end 19 of the container. The core 23 and the barrel 24 are straight, and are supported so that they are coaxial with the major axis of the device. The plunger 25 is a tubular part which cooperates with the core 23 and the barrel 24, the plunger being such that the opening 29 through it slidably receives the core 23 while its outside diameter is such that it slidably fits within the opening 30 of the barrel 24. The plunger fits over the core 23 and into the barrel 24 with working clearance, while the passage or escape of fluid between these parts is controlled by the packing means hereinafter described. The plunger 25 is preferably of such length as to extend a substantial distance into the barrel and to receive a sufficient amount of the core so that it is effectively guided by the core and barrel throughout the extent of its reciprocation relative to these parts. The plunger 25 is the only major moving or operating part of the ejector and is free to slide back and forth over the core 23 and in the barrel 24.

The inlet valve 26 is located at the projecting or free end of the barrel 24 and by reason of its location it can be a large valve which will readily pass lubricant from the container into the ejector barrel 24. In the form illustrated, the valve 26 is a ball valve carried in a cage 32 applied to the end of the barrel 24. The cage has an opening 33 normally closed by the valve 26. A helical spring 34 is arranged between the valve 26 and a suitable shoulder in the barrel 24 so that the valve 26 is normally yieldingly held against the inner end of the opening 33. The cage 32 is threaded to the end of the tube 24 so that it can be readily removed, making the valve 26 and spring 34 accessible.

The outlet valve 27 of the ejector is located at the forward end of the core 23. The valve illustrated is a ball valve located in a chamber 36 provided in the outlet 15 of the body section 11. The valve 27 is normally yieldingly held against a seat formed at the end of the core 23 by a spring 37 confined between the valve 27 and the fitting 16. The fitting 16 is shown screw threaded into the forward open end of the chamber 36 to form a retainer for the spring 37 and in practice it may be adapted for connection with any suitable means or device to, or from, which the lubricant may be dispensed.

The follower E is provided within the container B so that it is slidable in the cylindrical body 18 of the container and on the exterior of the barrel 24. The follower is adapted to move rearwardly against a body of lubricant confined between the follower and the end 19 of the container. As the follower E is maintained against the body of lubricant in the container the inlet valve 26 is flooded or continuously supplied with lubricant. The follower may be simple in form; for instance, it may be formed by a single packing member 40 carried by suitable plates 41 and 42. The packing member 40 illustrated has an opening through it and is flanged at 44 to seal around the barrel 24 and has a peripheral flange 45 to seal in the cylindrical body 18 of the container B.

A feature of the construction provided by this invention is the manner in which sealed engagement is maintained between the plunger 25 and the core 23 and the barrel 24. The seal between the plunger 25 and the barrel 24 is made in a central forwardly projecting boss 50 on the wall 14. Boss 50 has a counter-bore 51 extending into it from the rear face of the wall 14, which bore carries a suitable laminated packing 52 and a packing follower 53. The packing follower is screw threaded into the counter-bore so that it can be tightened against the packing. The packing 52 is preferably a laminated packing formed so that it is particularly effective in preventing escape of grease forwardly around the ram 25. In accordance with the invention the follower 53 forms the means of connection between the barrel 24 and the wall 14. It will be noted from the drawings that the forward end of the barrel 24 is screw threaded into the follower 53. A counter-bore 55 extends into the boss 50 from its forward end to carry packing 56. A follower 57 is threaded into the outer end of the counter-bore to engage the packing 56. Packing 56 may be similar to the packing 52 except that it is oppositely disposed so that it is effective in preventing leakage of air rearwardly around the plunger 25.

The seal between the plunger 25 and the core 23 is made through a hub 65 to which the plunger is connected forward of the boss 50. The hub 65 has a counter-bore 66 extending into it from its rear end carrying packing 67 and a follower 68. A counter-bore 69 extends into the hub 65 from its forward end to carry packing 70 and a follower 71. The follower 68 forms the means of connection between the plunger 25 and the hub, the forward end of the plunger being screw threaded into the follower. The packings 67 and 70 like the packings 52 and 56 are oppositely disposed and effectively sealed against the escape of grease and air around the core 23.

The operating means D for the ram 25 includes a cylinder and piston mechanism, the cylinder being formed by the cylinder part 12 hereinabove described and the piston being formed by the hub 65, a piston body 75 and suitable sealing elements 76 carried by the piston body to operate in the cylinder part 12. The piston body 75 is formed integral with the rear end of the hub 65, and, in accordance with the invention, is tubular in form and extends over the hub 50 which projects forward from the wall 14. The sealing elements 76 are carried by the rear end portion of the piston body 75 and may be in the form of cup leathers, or the like, confined between a flange 80 and a retaining ring 81. Through the overlapping or telescoping arrangement of the piston body 75 and boss 50, a compact, simplified arrangement of parts is obtained.

The handle F is, in accordance with the present invention, a unit detachable from the other parts of the device and carries the valve and valve carrier of the control means G. The handle F is supplied to the pad or boss 83 provided on the cylinder section 12 of the body A. The boss 83 is on what may be termed the lower side of the cylinder 12. In accordance with the construction provided by the invention the boss 83 presents a flat smooth face 84 to which the handle is applied and has a slightly raised finished face 85 within the confines of the face 84 on which the valve 86 of the control means G operates. The upper end of the handle is finished so that it is flat and makes sealing engagement with the face 84 of boss 83. In practice, the handle may be secured to the boss in various manners; for instance, it may be secured by a plurality of bolts 87 threaded through a suitable flange 88 at the upper end of the handle and into threaded openings provided in the boss 83. A suitable gasket 89 is provided between the handle and boss to make a fluid tight joint between these parts, the boss being formed to accommodate the ports hereinafter described. The handle is located so that it is at the normal center of gravity of the device and extends downwardly and somewhat rearwardly to present a part 90 to be grasped by the hand of the operator. The lower end of the handle is provided with a threaded opening 91 adapted to receive a pressure supply line, or the like. The opening 91 is connected by a duct 93 with the inlet passage 92 which extends upwardly through the handle to its upper end. The duct 93 is under control of a ball valve 94. A threaded stem 95 is arranged so that it can be operated to hold the ball valve 94 against a suitable seat in the duct 93 and thus close the duct. The stem 95 is provided with a control head 96 at the exterior of the handle. It will be noted that the head is located at the lower end of the handle where it is readily accessible and is convenient to operate.

The control means G includes, generally, the control valve 86 which cooperates with valve face 85 of boss 83, a carrier 97 for the valve 86, a spring 98 arranged to normally hold the valve in a predetermined position, an operating stem 99 extending from the valve carrier to the exterior of the handle, a suitable trigger 100 operatively engaging the stem 99, and various ports, as will be hereinafter described. The valve 86 is a D-type slide valve, designed to control communication between ports 101 and 102 extending to opposite ends of the cylinder 12 of body A and an exhaust port 103. The carrier 97 for the valve has a part mounted to reciprocate in a bore 104 in the handle. A suitable spring 105 is arranged in connection with the carrier and valve to normally yieldingly hold the valve in suitable pressure engagement with the valve face 85. The stem 99, which is in effect a part of the valve carrier, projects through a suitable packing gland provided in the handle so that its outer end is at the exterior of the handle to be engaged by the trigger 100. The trigger 100 is pivotally connected at 105a to the boss 83 so that it is in position to be conveniently engaged by the finger of the operator. The spring 98 is arranged in the opening 104 to engage the end of the valve carrier to normally urge the carrier forward so that the valve 86 is normally in a forward position. When the valve is in the forward position, the port 101, which extends from the valve face 85 to the forward end of cylinder 12, is connected with the exhaust 103. At the same time, the port 102, which extends between the rear end of the cylinder 12 and the face 85, is uncovered so that it is open to receive pressure from the inlet port 92 in the handle. It is to be noted that the valve mechanism just described is located in the upper end of the inlet port 92 provided in the handle. The exhaust port 103 extends from the face 85 of the boss 83 through the boss and to a point at the face where it communicates with a port 110 provided in the upper end face of the handle. Port 110 communicates with an exhaust port 111 which extends downwardly through the handle and opens at the lower end of the handle. When the valve is moved rearwardly, that is, to the position illustrated in Fig. 1, the port 101 is open to receive pressure from the inlet port 92 of the handle while the port 102 is connected with the exhaust port 103.

With the control just described, it will be obvious that the piston within the cylinder 12 can be operated or reciprocated in the cylinder 12 under control of the trigger 100. The valve is such that the piston is normally at the forward end of the cylinder 12 and when the operator moves the trigger rearwardly the valve is operated so that the piston is moved rearwardly in the cylinder.

In addition to the parts just described, the control means includes a means whereby fluid pressure is admitted by the control G to the container B behind the follower E to momentarily exert pressure upon the follower so that it is fed rearwardly and is maintained in engagement with the lubricant in the container so that the lubricant is effectively fed through the inlet valve of the ejector. The invention provides a port 115 communicating with port 101 and extending through the boss 83 of the body section 12 to communicate with the container 18. The port 115 is shown extending to the wall 14 and opening from the wall into the container B. With this arrangement or porting, when fluid pressure is admitted to port 101, it is also admitted to the port 115 and thus enters the container B to act on the follower therein to urge it rearwardly in the container. When the valve 86 is released to return to its normal position, the port 101 is immediately opened to the exhaust port 103 and, therefore, the port 115 is opened to the exhaust. In order to prevent an immediate drop of pressure in the container B behind the follower E and to maintain pressure on the grease in the container while the plunger is moving forward a check valve 116 is provided in the port 115 so that it is opened by pressure in the port 115 from port 101 and is closed when there is a drop of pressure in the port 101 relative to that in the container B. The valve 116 is preferably a ball check valve normally held on its seat 117 by a suitable spring 118. In accordance with the invention the valve just described is designed to leak slowly or to act as a bleeder valve so that the pressure admitted into the container B behind the follower C is trapped so that it does not escape as soon as the port 101 is opened to the exhaust but is held long enough to allow the mechanism to reestablish its normal position which occurs when the trigger 100 is released and the pressure in the container has acted to definitely feed the lubricant through the inlet valve of the ejector as the plunger moves forward in the barrel. In the particular construction illustrated, the seat 117 is provided with a notch 119 which prevents the ball valve 116 from closing tightly. It will be understood that the notch may be of such size or extent as to allow pressure to escape slowly past the valve 116. With the construction just described the operator can, if he so desires, remove the container B very shortly after the device has been operated without danger or inconvenience.

In the particular formation of parts illustrated, the port 115 has a portion 119a extending through the face of the handle, joining the boss 83 so that the valve 116, its spring 118 and seat 117 may be assembled into the structure from the face 84 of the boss 83 when the handle F is removed.

The invention provides a port 150 joining port 101 and extending to the exterior of the device to be open to atmosphere. A valve 151 is arranged to normally close the port 150 under action of a spring 152. The pressure of the spring 152 can be varied by regulating an adjustable stop 153. A stem 154 extends from the valve and through the stop to cooperate with an operating member 155. Member 155 is in the form of a screw that is normally spaced from the end of the stem but can be operated to engage the end of the stem to positively hold the valve closed. When normal pressure is desired on the lubricant delivered by the device the parts are positioned as shown in the drawings. Excess operating pressure admitted to port 101 escapes past valve 151. When high pressure is desired on the lubricant member 155 is operated to hold the valve 151 closed so that all the pressure admitted to port 101 acts to deliver lubricant from the device.

From the foregoing description, it will be obvious how the container B may be removed by disengaging the threaded connection at 21, making the container available for the reception of a suitable lubricant. When the container has been charged it is re-applied to the device so that the follower E, which is maintained on the barrel 24 of the ejector, bears on the lubricant in the container. When a suitable pressure line is connected to the handle F at 91 and the stem 95 is released to allow the valve 94 to open, pressure is established in the port 92 and the device is ready for operation. The spring 98 normally holds the valve 86 in position so that the piston in the cylinder 12 is at the forward end of its stroke. To eject a charge from the device under high pressure, the operator moves the trigger 100 rearwardly, operating the valve 86 so that the pressure from the inlet port 92 of the handle enters the forward end portion of the cylinder 12 to move the piston rearwardly. The piston carries with it the ram or plunger 25 of the ejector as it moves rearwardly. Lubricant that has entered the rear end of the barrel 24 is trapped by the valve 26 and is forced forward through the plunger and core 23 to be discharged past the outlet valve 27 and through the fitting 10 to a suitable point of delivery or device for conducting it. It will be obvious that the pressure or advantage gained by reason of the mechanism depends upon the differential in size between the acting parts of the ejector, that is, primarily, the difference in the internal diameter of the barrel 24 and the external diameter of the core 23. When the trigger 100 is released the spring 98 returns the valve 86 to its normal position causing the piston to be moved to its normal forward position in the cylinder 12. As the piston moves to its forward position, the plunger 25 is moved forward, creating a differential in pressure between the interior of the ejector and the container B so that lubricant is fed past the inlet valve 26 into the ejector ready to be ejected upon the next operation of the device. The fluid pressure admitted behind the follower E is maintained in the container B by the valve 116 long enough so that the lubricant is effectively fed under pressure past the valve 26 during the forward stroke of the piston assuring definite charging of the ejector.

Through the mechanism of the present invention, it is possible to handle heavy or viscous lubricants such as are not satisfactorily handled by ordinary grease handling equipment. It is to be noted that the pressure applied to the follower in the container acts to move or feed the body of lubricant in the container rearwardly so that the inlet valve of the ejector is always flooded. The arrangement and formation of parts insure complete and dependable charging of the ejector and as the ejector operates the lubricant is moved directly forward to the point of discharge. By reason of these features the internal resistance of the device to the flow of lubricant is reduced to a minimum making the device particularly effective in handling heavy or viscous lubricants.

Having described only a typical preferred form and application of our invention, we do not wish to be limited or restricted to the specific details set forth, but wish to reserve to ourselves any changes or variations that may appear to those skilled in the art or fall within the scope of the following claims:

Having described our invention, we claim:

1. A lubricant gun including, a body, lubricant supply means connected with the body, an ejector for receiving lubricant from the supply means and discharging it from the gun, and means for operating the ejector, the ejector including, a barrel, a valve controlling communication between the said supply means and the barrel, a core for conducting away the ejected lubricant, a valve controlling the discharge from the core, and a plunger operable in the barrel and over the core to eject the lubricant through the core.

2. A lubricant gun including, a body, lubricant supply means connected with the body, an ejector for receiving lubricant from the supply means and discharging it from the gun, and means for operating the ejector, the ejector including, a barrel having valved communication with the supply means, a core for conducting the ejected lubricant to the discharge of the gun, an outlet valve for the core governing the discharge therefrom, and a plunger operable in the barrel and over the core to eject the lubricant through the core.

3. A lubricant gun including, a body having an outlet opening, lubricant supply means connected with the body, an ejector for receiving lubricant from the supply means and discharging it from the gun, and means for operating the ejector, the ejector including, a barrel to receive the lubricant from the supply means, an inlet valve for the receiving end of the barrel, a tubular core for conducting the ejected lubricant to the outlet opening, an outlet valve at the outer end of the core to control the discharge therefrom, and a plunger operable in the barrel and over the core to eject the lubricant through the core.

4. A lubricant gun including, a body, lubricant supply means connected with the body, an ejector for receiving lubricant from the supply means and discharging it from the gun, and means for operating the ejector, the ejector including, a barrel for receiving lubricant from the supply means, a valve controlling communication between the supply means and the barrel, a core constituting the lubricant discharging element of the ejector, a valve controlling the discharge from the core, and a plunger operable in the barrel and over the core to eject the lubricant through the core, the lubricant supply means including a lubricant container detachably connected with the body and encasing the barrel.

5. A lubricant gun including, a body, lubricant supply means connected with the body, an ejector for receiving lubricant from the supply means and discharging it from the gun, and means for operating the ejector, the ejector including, a barrel receiving lubricant from the supply means, a valve controlling the admission of lubricant to the barrel from the supply means, a lubricant conducting core, a valve controlling passage of lubricant through the core, and a plunger operable in the barrel and over the core to eject the lubricant through the core, the lubricant supply means including a lubricant container detachably connected with the body and encasing the barrel and a follower operable in the container and on the barrel.

6. A lubricant gun including, a body, lubricant supply means connected with the body, an ejector for receiving lubricant from the supply means and discharging it from the gun, means for operating the ejector, the ejector including, a barrel for receiving lubricant from the supply means, a valve controlling communication between the supply means and the barrel, a core communicating with the discharge of the gun, a valve controlling the discharge of lubricant through the core, and a plunger operable in the barrel and over the core to eject the lubricant through the core, and packing means between the plunger and the barrel and between the plunger and the core.

7. A lubricant gun including, a body having a cylinder part, lubricant supply means connected with the body, an ejector for receiving lubricant from the supply means and discharging it from the gun, and means for operating the ejector, the ejector including, a barrel to receive the lubricant from the supply means, a valve controlling communication between the supply means and the barrel, a lubricant conducting core communicating with the outlet of the gun, a valve controlling the discharge of lubricant through the core, and a plunger operable in the barrel and over the core to eject the lubricant through the core, the means for operating the ejector including, a piston on one end of the plunger and operating in the cylinder part of the body.

8. A lubricant gun including, a body, lubricant supply means connected with the body, an ejector for receiving lubricant from the supply means and discharging it from the gun, and means for operating the ejector, the ejector including, a barrel projecting rearwardly from the body and adapted to receive the lubricant from the supply means, a valve controlling communication between the supply means and the barrel, a core in communication with the outlet of the gun, a valve controlling the discharge of lubricant through the core, and a plunger operable in the barrel and over the core to eject the lubricant through the core.

9. A lubricant gun including, a body having a cylinder part, lubricant supply means connected with the body, an ejector for receiving lubricant from the supply means and discharging it from the gun, and means for operating the ejector, the ejector including, a barrel carried by the body to project rearwardly therefrom and coaxial with the cylinder part and adapted to receive lubricant from the supply means, a valve controlling communication between the supply means and the barrel, a core carried by the forward end portion of the body to project rearwardly therefrom and coaxial with the barrel and having communication with the outlet of the gun, a valve controlling the discharge of lubricant through the core, and a plunger operable in the barrel and over the core to eject the lubricant through the core.

10. A lubricant gun including, a body having a cylinder part closed at its rear end by a wall and at its forward end by a cap said cap having an outlet nozzle, lubricant supply means connected with the body, an ejector for receiving lubricant from the supply means and discharging it from the gun, and means for operating the ejector including a piston operable in the cylinder part, the ejector including, a barrel projecting rearwardly from the wall to receive lubricant from the supply means, a valve controlling communication between the supply means and the barrel, a core communicating with the outlet nozzle of the gun projecting rearwardly from the cap and passing through the piston, a valve controlling the discharge of the lubricant through the core, and a plunger carried by the piston and operable in the barrel and over the core to eject the lubricant through the core.

11. A lubricant gun including, a body having a cylinder part closed at its rear end by a wall and at its forward end by a cap, lubricant supply means connected with the body, an ejector for receiving lubricant from the supply means and discharging it from the gun, and means for operating the ejector including a piston operable in the cylinder part, the ejector including, a barrel projecting rearwardly from the wall to receive lubricant from the supply means, a valve controlling communication between the supply means and the barrel, a lubricant conducting core having communication with the discharge of the gun and projecting rearwardly from the cap, a valve controlling the discharge of lubricant through the core, and a plunger carried by the piston and operable in the barrel and over the core to eject lubricant through the core, the supply means including a lubricant container detachably connected with the body and encasing the barrel.

12. A lubricant gun including, a body having a cylinder part closed at its rear end by a wall and at its forward end by a cap, said cap having a discharge nozzle, lubricant supply means connected with the body, an ejector for receiving lubricant from the supply means and discharging it from the gun, and means for operating the ejector including a piston operable in the cylinder part, the ejector including, a barrel projecting rearwardly from the wall to receive lubricant from the supply means, a valve controlling communication between the supply means and the rear end of the barrel, a core communicating with the discharge nozzle of the gun and projecting rearwardly from the cap, a valve controlling the discharge of lubricant from the forward end of the core, and a plunger carried by the piston and operable in the barrel and over the core to eject lubricant through the core, the supply means including a lubricant container detachably connected with the body and encasing the barrel.

13. A lubricant gun including, a body having an outlet opening at its forward end, lubricant supply means connected with the body, an ejector for receiving lubricant from the supply means and discharging it from the gun, and means for operating the ejector, the ejector including, a barrel for receiving lubricant from the supply means, a valve controlling communication between the supply means and the barrel, a core carried by the forward end portion of the body communicating with the outlet opening, a valve in the outlet opening sealing against the end of the core to control the discharge from the core, and a plunger operable in the barrel and over the core to eject the lubricant through the core.

14. A lubricant gun including, a body having a cylinder part, lubricant supply means connected with the body, a tubular core carried by the body and communicating with the outlet of the gun, a barrel carried by the body to communicate with the supply means, a piston in the cylinder part and having a hub surrounding the core, packing in the hub engaging the core, a packing follower carried by the hub to engage the packing, a plunger carried by the follower to extend into the barrel and over the core operable to eject the lubricant through the core, and valve means controlling the discharge of lubricant through the core.

15. A lubricant gun including, a body having a cylinder part, lubricant supply means connected with the body, a tubular core carried by the body and communicating with the outlet of the gun, a barrel carried by the body to communicate with the supply means, a piston in the cylinder part having a hub surrounding the core, oppositely disposed packings in the ends of the hub engaging the core, a plunger connected with the piston to extend into the barrel and over the core operable to eject lubricant through the core, a valve governing communication between the barrel and the supply means, and valve means controlling the discharge of lubricant through the core.

16. A lubricant gun including, a body having a cylinder part and a discharge nozzle, lubricant supply means connected with the body, a tubular core communicating with the discharge nozzle of the gun and carried by the forward end portion of the body to project rearwardly therefrom, a barrel carried by the rear portion of the body to project rearwardly therefrom and adapted to receive lubricant from the supply means, a piston in the cylinder part and having a hub surrounding the core, packing in the hub engaging the core, a packing follower carried by the hub to engage the packing, a plunger carried by the follower to extend into the barrel and over the core operable to eject lubricant through the core, a valve governing communication between the barrel and the supply means, and valve means governing the discharge of lubricant through the core and barrel.

17. A lubricant gun including, a body, lubricant supply means connected with the body, an ejector for receiving lubricant from the supply means and discharging it from the gun, and means for operating the ejector, the ejector including, a core carried by the body and forming the outlet of the ejector, a plunger operating over the core and operable to eject lubricant through the core, a valve controlling communication between the barrel and the supply means, packing carried by the body and engaging the plunger, a follower threaded to the body and engaging the packing, a barrel carried by the follower to communicate with the supply means and receiving the plunger, and valve means controlling the discharge of lubricant from the core.

18. A lubricant gun including a lubricant supply means, an ejector for receiving lubricant from the supply means and delivering it from the gun at high pressure, means for operating the ejector including a cylinder having a pressure admitting port, a piston in the cylinder and a main valve for controlling admission of fluid pressure to the cylinder through the port and a control for the operating means including an escape valve for controlling an outlet opening communicating with the port, spring means normally yieldingly holding the escape valve closed, and manually controlled means for positively holding the escape valve closed.

19. A lubricant gun comprising a body having a tubular part, a lubricant supply means operatively connected with the body, an ejector for receiving lubricant from the supply means and discharging it from the gun, the ejector comprising, a tubular core relatively stationary with respect to the body and forming the lubricant outlet of the ejector, a barrel in the gun, a tubular ejector plunger operable in the barrel and having the core entering it whereby it is operable to eject the lubricant through the core, an inlet valve controlling passage of the lubricant to the plunger, and an independent outlet valve for controlling the discharge of lubricant displaced by the plunger, and a power piston in said tubular part for actuating the plunger.

20. A lubricant gun comprising, a body having a tubular part, a lubricant supply means operatively connected with the body, an ejector for receiving lubricant from the supply means and discharging it from the gun, the ejector comprising, a tubular core relatively stationary with respect to the body, a barrel in the gun, a tubular ejecting plunger operable in the barrel and having the core entering it, and a valve structure relatively stationary with respect to the body and having a movable valve member for controlling the passage of lubricant through the core, and a piston on the plunger movable in the tubular part to operate the plunger.

21. A lubricant gun comprising, a body having a cylinder part, a lubricant supply means carried by the body, ejecting means for receiving lubricant from the supply means and discharging it from the gun, the ejecting means comprising, a core carried by the body to be stationary with respect thereto and forming the lubricant outlet of the ejector, a barrel on the body, an inlet valve for the barrel, and an open tubular plunger operable in the barrel and having the core received in its interior whereby it is operable to displace lubricant through the core, an outlet valve for the core for discharging the lubricant displaced by the plunger, and a piston surrounding the core and movable in the cylinder part to operate the plunger.

22. A lubricant gun comprising, a body having a cylinder part, a lubricant supply means carried by the body, ejecting means for receiving lubricant from the supply means and discharging it from the gun, the ejecting means comprising, a tubular core carried by the body to be stationary with respect thereto and operable to conduct the ejected lubricant, a discharge valve arranged to pass lubricant forced through the core, a barrel on the body having valved communication with the supply means, a tubular plunger operable in the barrel and having the core received in its interior, and a piston movable in the cylinder part to actuate the plunger.

23. A lubricant gun comprising, a body having a cylinder part, a lubricant supply means carried by the body, ejector means for receiving lubricant from the supply means and discharging it from the gun, said ejector means comprising, a barrel stationary with the body, a piston tube stationary with respect to the body, a tubular plunger operable in the barrel and working on the piston tube, an inlet valve for the barrel, and an outlet valve arranged to pass lubricant forced through the piston tube, and a piston operable in the cylinder part to operate the plunger and movable on the piston tube.

24. A lubricant gun comprising a hollow body, a lubricant container detachably connected to the body, a tubular core relatively stationary with respect to the body and extending into the latter, a barrel relatively stationary with respect to the body and projecting into said container, a tubular plunger slidably and telescopically connected with the core and extending into said barrel, a valve for controlling the passage of lubricant from the container into the barrel, a second valve for controlling the discharge of lubricant from the core, and means in the body operatively connected with the plunger for actuating the latter.

NEIL V. SMITH.
CARL W. STOLL.